UNITED STATES PATENT OFFICE.

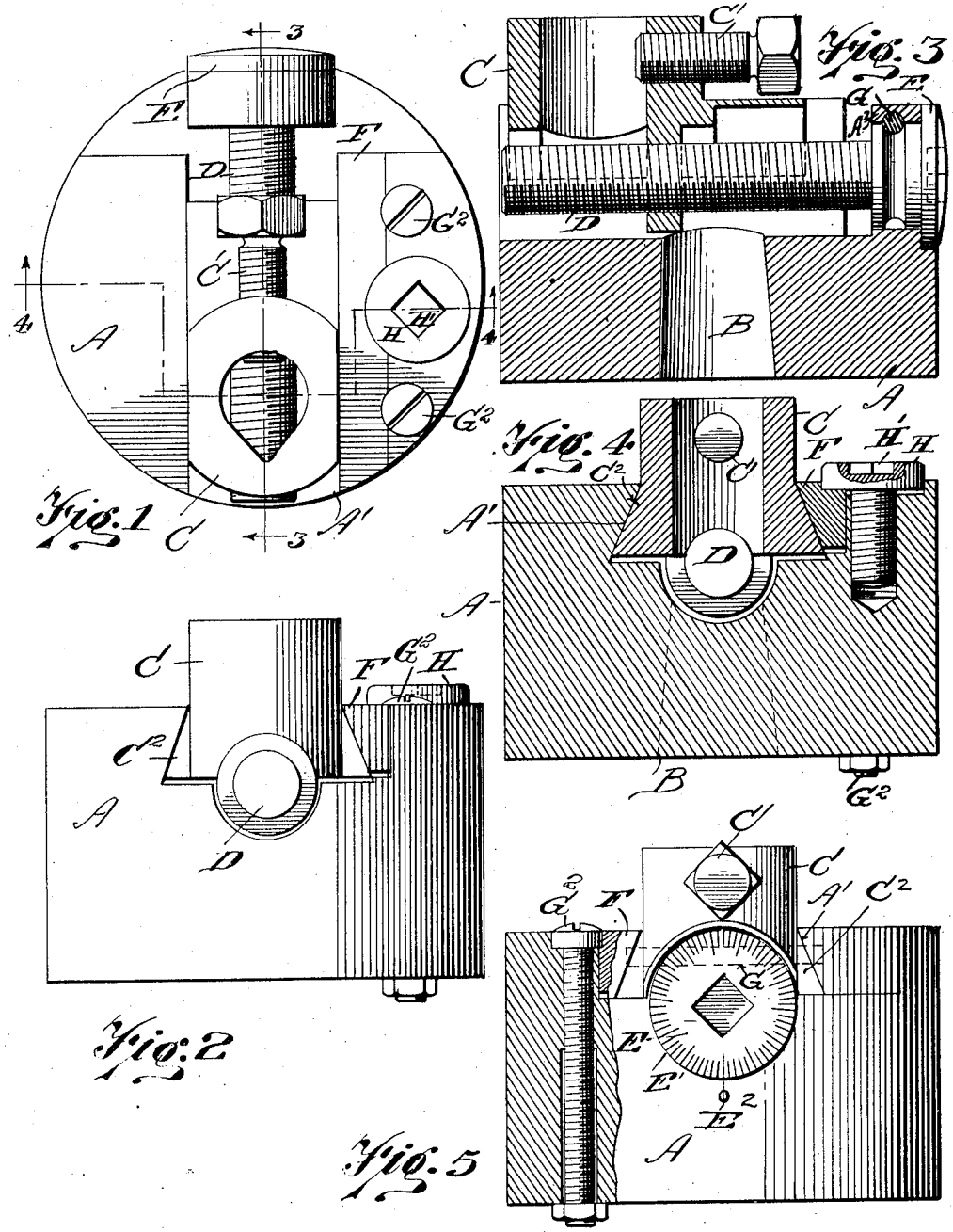

HARVEY ELLIOTT AND EARL B. AINSWORTH, OF DETROIT, MICHIGAN.

ECCENTRIC CHUCK.

1,355,757.  Specification of Letters Patent.  Patented Oct. 12, 1920.

Application filed May 24, 1919. Serial No. 299,400.

*To all whom it may concern:*

Be it known that we, HARVEY ELLIOTT and EARL B. AINSWORTH, citizens of the United States, residing at Detroit, county of Wayne, State of Michigan, have invented a certain new and useful Improvement in Eccentric Chucks, and declare the following to be a full, clear, and exact description of the same, such as will enable others skilled in the art to which it pertains to make and use the same, reference being had to the accompanying drawings, which form a part of this specification.

Our invention relates to an eccentric chuck, shown in the accompanying drawings and more particularly pointed out in the following specification and claim:—

One object of this invention is to provide a chuck of simple and inexpensive construction, having a relatively wide lateral adjustment extending from the axis of the spindle on which it is mounted to the outer periphery of the chuck.

With the foregoing and other objects in view which will appear as the description proceeds, the invention resides in the combination and arrangement of parts and in the details of construction hereinafter described and claimed, it being understood that changes may be made in the precise embodiment of the invention herein disclosed without departing from the spirit of the same.

In the accompanying drawings forming part of this specification:—

Figure 1 is a plan view of the chuck.

Fig. 2 is a side elevation looking toward the tool holder proper, and also the end of the adjusting screw for shifting the position of the latter.

Fig. 3 is a cross-sectional view on line 3—3 of Fig. 1.

Fig. 4 is a cross-sectional view on line 4—4 of Fig. 1.

Fig. 5 is a side elevation, with parts in section, as viewed from the side opposite that shown in Fig. 2.

Referring now to the letters of reference placed upon the drawings:—

A, denotes a head with a tapering socket B, to receive a mandrel (not shown) of a lathe, or the like.

C, indicates a laterally adjustable tool holder, having a socket of wedge shaped form to receive a tool (not shown). C', is a set screw to secure the tool in the holder.

D, designates a screw for adjusting the tool holder having an enlarged head E, formed with a peripheral groove to receive a transverse pin G,—lodged partially therein and partially in the wall of the supporting head, to secure the screw against displacement. The supporting head is provided with a projecting portion $A^2$ having an opening in which the head E of the screw is swiveled by the said pin G. The head E of the screw is reduced to fit the opening of the projecting portion $A^2$. The head E, of the screw is also provided with a series of graduations E', which are read in conjunction with the pointer $E^2$, on the wall of the supporting head when adjusting the screw.

The tool holder C, is dovetailed at $C^2$, and travels in a corresponding groove A', in the supporting head. The projecting portion $A^2$ of the head A is located at one side of the latter in line with the groove A'.

F, indicates a gib, overlapping one of the dovetailed sides of the tool holder, held in position by the screws $G^2$, $G^2$, and binding screw H,—in turn provided with a socket H', to receive a wrench.

Having indicated the several parts by reference letters, the construction and operation of the device will be readily understood.

The tool having been lodged in the holder C, may then be secured by the set screw C'. The gib F, is then adjusted by means of the screws $G^2$, $G^2$, into close relation with the dovetailed side of the tool holder, to provide for an accurate adjustment of the holder upon the operation of the graduated screw D;—which may range from the axis of the chuck to its outer periphery. Having secured the proper adjustment of the tool holder, it is then "locked" by the binding screw H, engaging the gib.

Having thus described our invention, what we claim is:—

In a device of the class described, a supporting head having a transverse groove across its face and provided beyond one end of the groove with a projecting portion having an opening, a slidable tool holder provided with a dovetailed extension fitted to the groove in the supporting head, a gib having a beveled face at its inner side and a vertical face at the outer side and adapted to overlap one of the dovetailed sides of the tool holder, spaced bolts mounted in the supporting head beyond the gib and having heads overlapping the gib and engaging the same to fix the said gib into adjacent relation with the abutting dovetailed portion of the tool holder, an adjusting screw screwed into the body of the supporting head beyond the said gib and having a head overlapping the gib and adapted to force the same into locking relation with the tool holder, said screw bolts and adjusting bolt having their heads fitted in recesses of the gib for holding the same against relative movement longitudinally of the slidable tool holder, and an adjusting screw connected with the slidable tool holder and with the projecting portion of the supporting head.

In testimony whereof, we sign this specification in the presence of two witnesses.

HARVEY ELLIOTT.
EARL B. AINSWORTH.

Witnesses:
S. E. Thomas,
John Considine, Jr.